United States
Yamamura et al.

[11] 3,748,017
[45] July 24, 1973

[54] ELECTRODES FOR LIQUID CRYSTAL DISPLAY DEVICE

[76] Inventors: Katsumi Yamamura, 5531-28, Nakasu, Suwa-shi, Nagano-ken; Kouji Kakizawa, 780-3, Oaza-Shiga, Suwa-shi, Nagano-ken; Yoshio Yamazaki, 10616, Takagi, Shimosuwa, Suwa-gun, Nagano-ken; Kanemitsu Kubota, 855-4, Shiga, Suwa-shi, Nagano-ken; Izuhiko Nishimura, 3-3-5, Owa, Suwa-shi, Nagano-ken, all of Japan

[22] Filed: May 26, 1971

[21] Appl. No.: 146,946

[30] Foreign Application Priority Data
June 5, 1970 Japan.............................. 45/48051
June 10, 1970 Japan.............................. 45/49489

[52] U.S. Cl............................................ 350/160 LC
[51] Int. Cl................................................. G02f 1/16
[58] Field of Search............................... 350/160 LC

[56] References Cited
UNITED STATES PATENTS
3,505,804  4/1970  Hofstein................................. 58/23
3,600,060  8/1971  Churchill et al..................... 350/160
3,614,210  10/1971  Caplan............................... 350/278

OTHER PUBLICATIONS

Heilmeier et al.: "Further Studies of the Dynamic Scattering Mode in Neumatic Liquid Crystals", IEEE Trans. on Electron Devices, ED-17, pp. 22-26, Jan., 1970.

Heilmeier et al.: "Dynamic Scattering: A New Electrooptic Effect in Certain Classes of Nematic Liquid Crystals", Proc. IEEE, Vol. 56, pp. 1162-1171, July, 1968.

*Primary Examiner*—Edward S. Bauer
*Attorney*—Blum, Moscovitz, Friedman and Kaplan

[57] ABSTRACT

In a liquid crystal display device, gases, and in particular, $H_2$ and $O_2$ may be generated. Deleterious effects are avoided by incorporating in at least one of the electrodes a catalyst for the recombination of said gases.

6 Claims, 3 Drawing Figures

Patented July 24, 1973 3,748,017

ELECTRODES FOR LIQUID CRYSTAL DISPLAY DEVICE

BACKGROUND OF THE INVENTION

Liquid crystal display devices are known in which the liquid crystals are caused to disperse or scatter light by the imposition of an electric field.

Although nematic and cholesteric liquid crystals both scatter light when subjected to an electric field, the nematic type is particularly sensitive.

Such display devices are both useful and attractive, and would, no doubt, be widely used if it were not for the fact that the life of such devices is relatively short. The difficulty stems from the fact that it is very difficult to free the liquid crystals from traces of water in the process of manufacture. As a result, when voltage is applied across the crystals, some faradaic current flows and the water is electrolyzed producing $H_2$ and $O_2$. The standard conductive, transparent film used for imposition of the electric field consists of tin oxide. The tin oxide is sensitive to reduction by the hydrogen produced in the electrolysis so that the tin oxide gradually darkens and loses its transparency, thus terminating the usefulness of the display device. Furthermore, as the gases are generated, they form bubbles which tend to cling to the interior surfaces of the vessel containing the liquid crystals, thus interfering with the effectiveness of the display even without reducing the tin oxide.

SUMMARY OF THE INVENTION

The gases generated in liquid crystal display devices as the result of the imposition of an electric field between electrodes in contact with the liquid crystals may be catalytically recombined. To effect the recombination, a catalyst is incorporated in at least one of the electrodes. Suitable catalysts for the recombination of hydrogen and oxygen are the transition metals. The transition metals used for this purpose may be deposited on a base layer of a different metal.

Accordingly, an object of the present invention is the provision of a liquid crystal display device having a long life.

Another object of the present invention is a liquid crystal device wherein such gases as are evolved during operation are prevented from impairing the effectiveness of the device.

Still other objects and advantages of the invention will in part be obvious and will in part be apparent from the specification.

The invention accordingly comprises the features of contruction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

Figure 1:
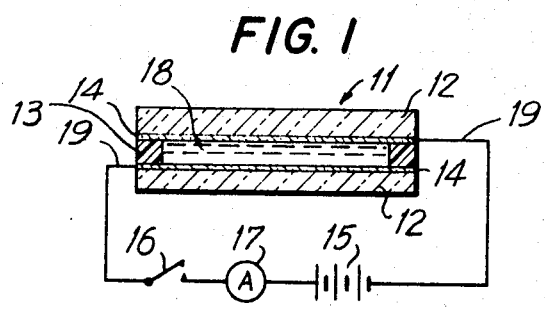
FIG. 1 is a plan view of a liquid crystal display device of conventional construction.

The liquid crystal material used in the preparation of liquid crystal display devices may contain small quantities of water either as a residue from the manufacturing process or as the result of absorption of moisture from the air during assembly of the device. Such water as is present will be electrolyzed when a sufficient voltage is impressed on the electrodes which are used to actuate the device. As indicated above, hydrogen generated in this way can reduce tin oxide to metallic tin thus eventually terminating the usefulness of the device. In accordance with the present invention, a catalyst, preferably metallic, is incorporated in at least one of the electrodes to cause recombination of the gases. When $H_2$ gas is adsorbed on a metallic catalyst, chemical combination between the gas and the catalyst results. The bonds formed are covalent, as a consequence of which it is desirable that the metal used as catalyst have a d-orbital gap in its electron shell. For this reason, the transition metals are suitable catalysts. Tests have shown that platinum, palladium, nickel, rhodium, iridium and cobalt are effective for prolonging the life of liquid crystal display devices by recombining the gases generated.

The $H_2$ generated at the negative electrode when taken up by the catalyst is believed to be dissociated into active H atoms. Each atom reacts with a hydroxide ion as follows:

The oxygen molecule, in contrast, is not absorbed, but instead accepts two electrons at the negative electrode as follows:

The peroxyl ion formed in the process dissociates to form hydroxyl ion plus oxygen as shown in the following equation:

The net oxygen reaction is:

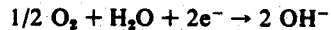

The sum of the individual reactions is as follows:

The results of careful tests show that the recombination reaction takes place without any side reactions involving changes in the liquid crystal material or in the electrodes. Furthermore, it has been found that the reactions proceed rapidly enough so that it is not necessary to use the most effective catalyst such as platinum black or palladium black, which also are the most expensive. It is believed that the reason for the effectiveness of the less expensive and less active catalyst metals is due to the fact that the hydrogen and oxygen are generated in the atomic state.

The way in which the display devices of the present invention are used can be better understood in relation to the accompanying drawing. Conventionally, a vessel, indicated generally by the reference numeral 11, is formed of two sheets of glass 12 and a U-shaped insulating spacer 13 which preferably is of plastic. Each of the sheets of glass 12 has on the inner face thereof a transparent conductive film 14. The films 14 are connected to opposite sides of a DC power supply 15 through a switch 16 and an ammeter 17. The vessel contains the liquid crystal material 18. Connections between the conductive films 14 and the power source 15 are made by means of the voltage leads 19. These leads also function as current leads with respect to the faradaic current which electrolyzes the water present.

A display device in accordance with the present invention indicated generally by the reference numeral 21, has one face made of glass with the usual conductive film 14 thereon, and one face 22 consisting of a catalyst for the recombination of hydrogen and oxygen. Such a system can be operated for long periods without degeneration.

Figure 2:
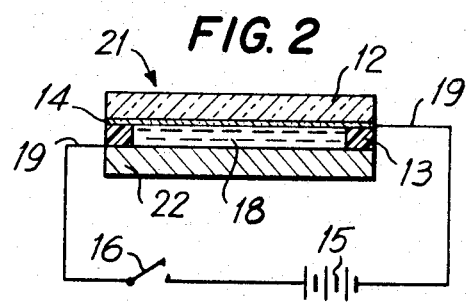
FIG. 2 is a plan view of a liquid crystal display device in accordance with the present invention.

The same objective can be achieved by making the conductive film 14 as shown in FIGS. 1 and 2 of a transition metal oxide or of oxides of transition metal alloys. Similarly the metal electrode 22 may also consist of a transition metal alloy.

To understand the severity of the problem solved by the present invention, it has been noted that when a field of $5 \times 10^4$ V/cm is imposed across nematic liquid crystals between Nesa glasses that bubbles appear within an hour and that half the display area is covered with bubbles after 2 to 3 hours. When platinum black or palladium black electrodes are used, no bubbles are generated for much longer periods. Surprisingly, when palladium plate or platinum plate electrodes having a ground finish are used, bubbles similarly are not generated for a long time. Even more surprisingly, the same effect is obtained when using ground nickel plate or materials such as rhodium, cobalt, iridium, osmium or alloys of these materials. It has also been found that the activity of the catalyst can be adjusted by using an alloy of a catalytic transition metal and a non-active metal.

Figure 3:
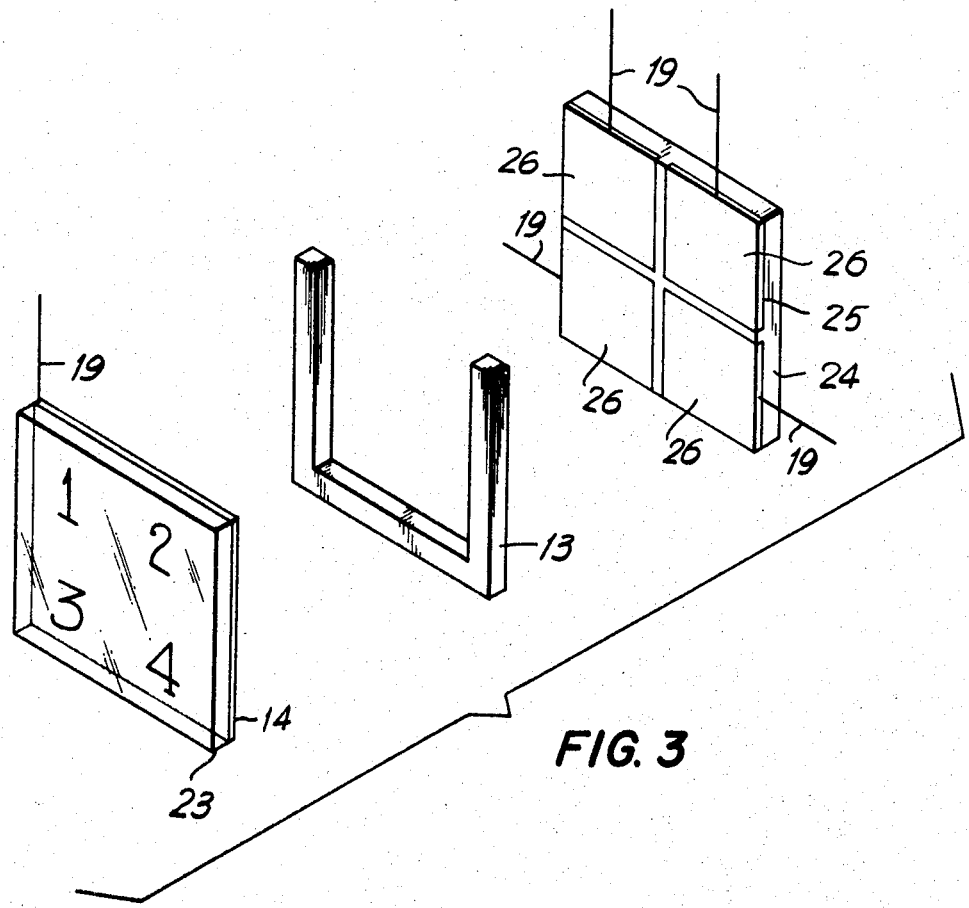
FIG. 3 is an exploded view in perpective of a segmented display device.

Catalytic metals and their oxides may be used in a variety of ways for the recombination of gases generated during operation. One such form is shown in FIG. 3 where 23 is a transparent plate inscribed with indicia and which has on one face thereof a transparent conductive layer. The opposite face of the cell is the transparent glass plate 24, the interior face of which has thereon a segmented conductive layer, each segment being equipped with a conductive lead 19. In operation, voltage can be applied to any one or any combination of the segments 26. The result is to change the appearance of any one or any combination of the numbers on the plate 23.

In another embodiment, the catalytic metal plate 22 (FIG. 2) can be replaced by a metallic base plate having thereon a facing of a catalytic metal or catalytic metal oxide. The base plate can be of a conductive metal and preferably of one of the transition metals which are less active catalysts and simultaneously less expensive than the metals proposed for the facing layer. Such less active transition metals are nickel, aluminum, copper, manganese, chromium, iron, titanium, tantalum and molybdenum. In a somewhat similar embodiment, the base metal, either as metal or an oxide, can be deposited as a thin layer on a glass sheet and the more active catalysts can be deposited on the base layer.

As has already been noted, the preferred catalytic metals can be deposited on a glass support in the form of transparent metal oxides. To form such oxides, a metal chloride or combination of metal chlorides is sprayed onto glass sheets which is just below the fusing temperature, a procedure which results in a transparent oxide film. The chloride of the catalytic metal may be mixed with tin-chloride prior to applying to the glass sheet. The Nesa film may also be formed by evaporation or by dipping.

The display devices of the present invention are suitable for a wide range of applications. For example, such devices may be used for instruments operating in regions of reduced light levels such as an aircraft cockpits. With proper design, such devices are also applicable where the surrounding level of illumination is high. In addition, the attractive appearance of such devices makes them appropriate for use in watches, and particularly, in ladies' watches.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A display device comprising a liquid crystal material, electrodes across which a voltage may be applied and an insulating spacer, said electrodes and said spacer forming a vessel containing said material, said applied voltage serving to scatter light, said material generating hydrogen and oxygen gases on the application of said voltage, and at least one of said electrodes comprising a material selected from the group consisting of Pd, Pt, Ir, Rh, Co, Fe, Os, Ru and alloys thereof, said one of said electrodes being ground to form a non-specularly reflecting catalyst effective for the recombination of said gases.

2. A display device as defined in claim 1, wherein the other of said electrodes is transparent.

3. A display device as defined in claim 1, wherein said device has indicia thereon, said indicia being individually susceptible to change in appearance by imposition of said voltage across said electrodes.

4. A display device as defined in claim 3, wherein said device is an instrument.

5. A display device as defined in claim 3, wherein said device is a watch.

6. A display device comprising a liquid crystal material, electrodes across which a voltage may be applied and an insulating spacer, said electrodes and said spacer forming a vessel containing said material, said applied voltage serving to scatter light, said material generating hydrogen and oxygen gases on the application of said voltage, and at least one of said electrodes comprising a material selected from the group consisting of platinum black and paladium black as a catalyst effective for the recombination of said gases.

* * * * *